Figure 1:
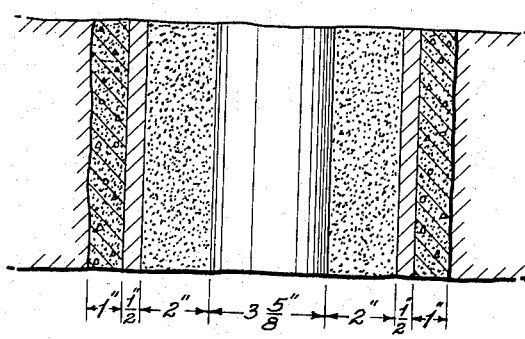

Aug. 17, 1954　　　G. HERZOG ET AL　　　2,686,881
MEASURING ABSOLUTE RADIOACTIVITY OF BOREHOLE FORMATIONS
Filed March 23, 1951

INVENTORS
GERHARD HERZOG
ALEXANDER S. McKAY
BY
ATTORNEYS

Patented Aug. 17, 1954

2,686,881

UNITED STATES PATENT OFFICE 2,686,881

MEASURING ABSOLUTE RADIOACTIVITY OF BOREHOLE FORMATIONS

Gerhard Herzog, Houston, and Alexander S. McKay, Bellaire, Tex., assignors to The Texas Company, New York, N. Y., a corporation of Delaware Application March 23, 1951, Serial No. 217,238

3 Claims. (Cl. 250—43.5)

This invention relates generally to the logging of bore holes for the purpose of determining the depth and the nature of the subsurface formations traversed by the bore hole. The principal object of the invention is to provide a method whereby the "absolute radioactivity" of the formations can be obtained without regard to certain disturbing factors such as the presence of well casing, cement around the casing, the absorption effect of drilling mud in the hole and the radio-activity naturally present in the drilling mud.

In taking natural gamma ray radioactivity logs of wells one is desirous of obtaining a measurement of a physical quantity which describes the formations surrounding the bore hole. The result of the measurement should be independent of man-made disturbances such as the introduction of the casing, the drilling mud, cement, and others. It has been found that a measurement of the naturally occurring radioactivity of a formation is closely connected with its geological deposition. Therefore the knowledge of the "activity" can be used for geological interpretation purposes.

In general one understands by "radioactivity" the amount of radioactive substances contained in 1 cc. of material or sometimes it is expressed as radioactivity per gram of formation or rock. It would, therefore, be best if a figure for the "absolute radioactivity" so defined could be directly obtained in well logs. Practically, however, in well logging the detector for radioactivity is surrounded by an infinitely large sample. (This assumes that the formations are sufficiently thick to represent an infinite medium.) Each volume element of the formation contributes to the total radioactivity which is measured by the detector. It is not difficult to add mathematically the contributions of all the elements provided due consideration is given to the absorption caused by the medium and which acts on the radiation coming from the various elements. The total effect which so accumulates, however, is proportional to the "absolute radioactivity," that is, to the activity per cc. or per gram. The accumulated absorption effect remains unchanged for various formations, if the average density of the materials is approximately the same. Fortunately the densities of the various formations traversed by a bore hole are about the same and one therefore can say that for practical purposes the total intensity which is measured in a bore hole in the absence of man-made disturbances is a true representation of "absolute radioactivity." The following discussions are given in order to provide a method for correcting measurements in actual wells so that the resulting values truly represent radioactivity in the above sense.

As is well known, a natural gamma ray log of a bore hole is made by passing through the hole an instrument capable of detecting variations in the intensities of gamma rays naturally emitted from the formations. In that form of natural gamma ray logging which is preferred in connection with this invention the radiation detector is an electrical discharge device of the current pulse producing or counter type. The output of the counter is usually preamplified within the logging instrument housing and the preamplified output then passed to the surface over a conductor cable where it may again be amplified and recorded in correlation with the depth or position of the instrument in the bore hole. One reason why a detector of the counter type is preferred is that with such a device a line may easily be established on the record, this line representing zero radioactivity.

Although bore holes have been logged in the manner outlined in the preceding paragraph for several years, these logs are not true measurements of the absolute radioactivity of the formations since they are affected by the several factors mentioned above. The entire bore role, or at least a portion thereof, will in all probability be provided with an iron or steel casing and part, at least, of this casing may be surrounded by cement. Again the hole will in all probability be filled with drilling mud and it will be seen that the logging instrument will therefore be surrounded in those locations by layers of mud, casing and cement. Gamma rays emitted from the formations and which tend to pass into the bore hole to strike the logging detector will be absorbed to a greater or lesser degree by these layers of substances other than the formations themselves. It will be seen therefore that the measured intensity of the gamma rays will be less than it should be due to the absorption effects of these layers. At the same time some gamma rays will be emitted within the drilling mud itself and these will be registered by the detector to produce an indication which is somewhat higher than it should be.

In accordance with this invention a method is provided by means of which the absorption effects of the mud, casing and cement and the additive effect of the radioactivity of the drilling mud can be determined and these effects added to or subtracted from the intensity measured by the detector so that the resulting log will as far as possible be a true indication or record of the absolute radioactivity of the formations.

Figure 2:
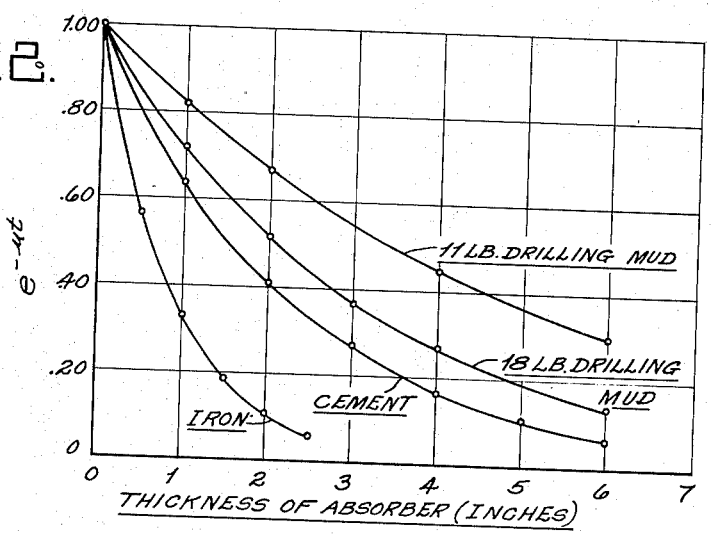
Figure 3:
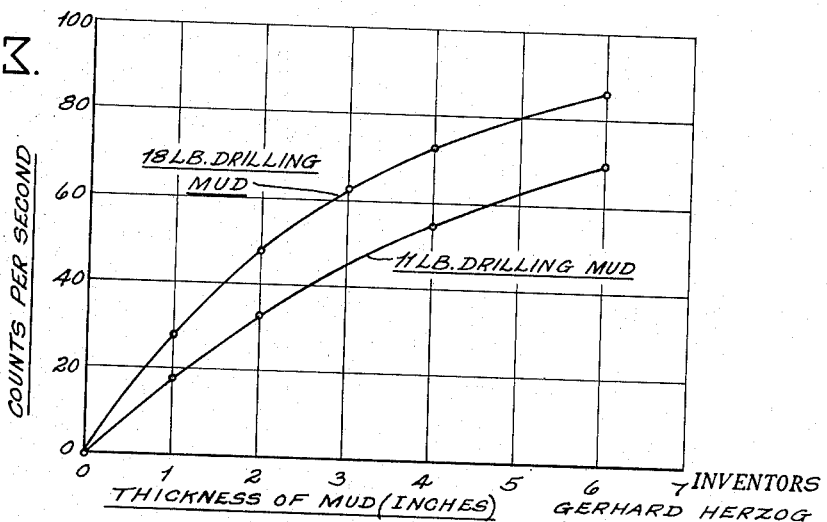

For a better understanding of the invention reference may be had to the accompanying drawing in which Figure 1 represents a narrow section through a bore hole in which a detector is surrounded by drilling mud, well casing and cement;

Figure 2 is a curve showing the absorption of gamma rays by drilling mud, cement and iron, and Figure 3 is another curve showing counting rate as a function of drilling mud thickness.

Let us assume that an instrument containing a gamma ray counter is being passed through a portion of a bore hole which contains drilling mud, which portion is provided with a casing and which has an annular layer of cement around the casing. Such a section of a bore hole is illustrated in Figure 1 and typical dimensions have been applied to the thicknesses of the several layers surrounding the detector. For purposes of simplicity the detecting instrument is illustrated as though the counter occupied all of the volume of the logging instrument. The observed counting rate can usually be considered as having two sources, $(a)$ the radioactive formations that are being logged, and $(b)$ a contribution from the drilling mud and perhaps from the cement. The observed counting rate will be lower than it would be if the detector were exposed to the absolute radioactivity of the formations due to the absorption effect on the radioactivity of the cement, the casing and the mud surrounding the detector. This may be more clearly expressed by the following equation:

$$I = I_0(e^{-\mu_1 t_1} \times e^{-\mu_2 t_2} \times e^{-\mu_3 t_3}) + f(DMt) \quad (1)$$

In the above equation $I$ is the observed counting rate and $I_0$ is the rate that would be observed in a dry uncased hole and the corrections are designed to determine this rate. The various exponential terms within the first parenthesis represent respectively the absorption effect of the cement, the iron casing and the drilling mud. Of course, if any one of these is absent the corresponding $t = 0$ and $e^{-\mu t} = 1$. Values of $e^{-\mu t}$ are given in Figure 2 for iron, cement, and drilling mud of two weights as calculated for one mev. gamma rays. For example, one inch of iron will reduce the incident gamma ray intensity to $0.33 \, I_0$, while 2.5 inches of cement are required for the same reduction. Actually, a layer of cement will reduce the incident intensity slightly less than that given by the curve because of its own radioactivity but for the most purposes this can be neglected. The term $f(DMt)$ represents the contribution of the radioactivity of the drilling mud and depends upon the thickness $t$, the density $D$ and "radioactive intensity" $M$ of the mud. The dependence of the counting rate on the thickness and density of the drilling mud is shown in the curves of Figure 3 where 100 represents the counting rate in a sea of mud of infinite size. The absolute value of this counting rate can be measured at the surface, that is, not in the bore hole itself, by taking the counting rate with the counter suspended in a mud trap, i. e., a bath of mud.

For example, let us suppose that the counting rate in the mud trap is 80 counts per second.

From Figure 3 two inches of 18 lb. mud would give a counting rate of $$48 \times \frac{80}{100} = 38.4 \text{ counts per second}$$

while two inches of 11 lb. mud would give $$33 \times \frac{80}{100} = 26.4 \text{ counts per second}$$

It will be realized that the correction for the radioactivity of the drilling mud may sometimes be negligible such as where the surrounding layer of mud is very thin. However, in other instances it may be a very important factor, as when the mud is made up of highly radioactive clays. In this latter case the radioactivity of the mud may even mask or completely obscure the radioactivity of the formation, particularly since the more important formations are sands and hence have a naturally low radioactivity.

For determining the specific radioactivity of the mud, i. e., the radioactivity per unit volume of mud, the following methods may be used at the surface:

(1) A counter of smaller size than that used in the actual well logging may be dipped in a known volume of mud and the relative sensitivities of the two counters taken into consideration.

(2) A so-called cup counter, that is, a counter provided with an interior space for the insertion of specimens can be filled with the mud while again taking into consideration the relative sensitivities of the cup counter and the counter to be used in the logging.

(3) The logging counter itself can be dipped in a mud bath where the thickness of the mud surrounding the counter is known.

(4) The measurement of the specific radioactivity of the mud will, of course, be done at the surface, and an appreciable part of the counting rate of the counter being used to test the mud will probably be caused by cosmic rays. This rate will be constant for any one location and can be determined by first immersing the counter in a mud trap and subsequently immersing the counter in a non-radioactive fluid such as water or oil and correcting the measurements for the difference in densities of the mud and the water or oil. The thickness of the layer or wall of water or oil surrounding the counter should have equal gr./cm.$^2$ as the mud being tested. To determine the thickness of this annular layer of water, for instance, and assuming that 3 cm. of mud having a density of 2 is to be used in the test, then $$3 \times 2 \text{ cm. } \frac{\text{gr.}}{\text{cm.}^3} = 6 \frac{\text{gr.}}{\text{cm.}^2}$$

Therefore, $6 = t \times 1$ (1 being the density of water) $= t$, or in other words the thickness of the water layer should be 6 cms. to correspond with a mud layer of 3 cms.

As an example of the application of the complete correction for all of the factors which have been mentioned, let us assume that the thicknesses of the surrounding layers are as indicated in Figure 1. Assuming a counting rate of 80 counts per second is observed in the bore hole and the counting rate in the observed mud trap was 100 counts per second, then using the curves of Figures 2 and 3 we find that, in Equation 1

$80 = I_0 \times .64$ (1 inch cement) $\times .57$ (½ inch iron) $\times .52$ (2 inches of 18 lb. mud) plus $$100 \times \frac{48}{100}$$

(2 inches of 18 lb. mud from Figure 3)

then $0.19 I_0 = 80 - 48 = 32$ and $$I_0 = \frac{32}{.19} = 168 \text{ counts per second}$$

which is the "absolute" counting rate, i. e., that which would have been observed at the same location in the bore hole provided there had been no mud, casing or cement between the counter and the walls of the formation.

It will be seen that with the method described above the radiation intensity as measured in a bore hole by means of a detector of the counter type can be converted to the "absolute radioactivity" of the corresponding formations. When the radiation detector is of the counter type the zero line can be placed on the log and the absolute radioactivities can then be measured from this line. If desired, suitable well known electronic circuits can be used to increase the observed reading proportionately to the absorption caused by the cement, casing and the mud and to decrease the observed reading according to the radioactivity of the mud so that the final reading will be substantially identical with the "absolute radioactivity" of the formations as it has been defined hereinabove.

Obviously many modifications and variations of the invention as hereinbefore set forth may be made without departing from the spirit and scope thereof, and only such limitations should be imposed was are indicated in the appended claims.

We claim:

1. The method of logging a steel cased bore hole containing drilling mud to determine the absolute gamma radioactivity of the formations traversed by the bore hole, which comprises passing a gamma ray detector of the pulse-producing type through said hole and recording the counting rate of the pulses produced due to the total radioactivity of the material surrounding the detector, immersing said detector in a mass of the drilling mud having a thickness of at least one foot around the detector to determine the absolute natural gamma radioactivity of said mud, from this figure and a knowledge of the density of the mud and the thickness of the annular layer of mud between the detector and the bore hole casing determining the detector counting rate due to said mud layer, determining the loss in counting rate due to gamma ray absorption in said mud layer, said casing and the wall of cement, if any, around the casing, and correcting the said measurements of total radioactivity by subtracting from said measurements the counting rate due to said natural radioactivity of the mud layer and adding the counting rate due to gamma ray absorption in said mud layer, said casing and said cement wall.

2. The method of logging a steel cased bore hole containing drilling mud and having a cement layer around the casing to determine the absolute gamma radioactivity of the formations traversed by the bore hole which comprises passing a gamma ray detector of the pulse-producing type through said hole and recording the counting rate of the pulses produced due to the total radioactivity of the material surrounding the detector, immersing said detector in a mass of the drilling mud having a known thickness to determine the absolute natural gamma radioactivity of said mud, from this figure and a knowledge of the density of the mud and the thickness of the annular layer of mud between the detector and the bore hole casing determining the detector counting rate due to said mud layer, determining the loss in counting rate due to gamma ray absorption in said mud layer, said casing and the layer of cement and correcting the said measurements of total radioactivity by subtracting from said measurements the detector counting rate due to said natural radioactivity of the mud layer and adding the detector counting rate due to gamma ray absorption in said mud layer, said casing and said cement layer.

3. The method of logging a steel cased bore hole containing drilling mud and having a cement layer around the casing to determine the absolute gamma radioactivity of the formations traversed by the bore hole which comprises passing a gamma ray detector of the pulse-producing type through said hole and recording the counting rate of the pulses produced due to the total radioactivity of the material surrounding the detector, immersing the detector in a vessel of water to determine the detector counting rate due to the cosmic rays intercepting the detector, immersing said detector in a vessel containing drilling mud and determining the counting rate, subtracting said cosmic ray counting rate from the drilling mud counting rate to determine the absolute natural gamma radioactivity of said mud, from this figure and a knowledge of the density of the mud and the thickness of the annular layer of mud between the detector and the bore hole casing determining the counting rate due to said mud layer, determining the loss in counting rate due to gamma ray absorption in said mud layer, said casing and the layer of cement, and correcting the said measurements of total radioactivity by subtracting from said measurements the detector counting rate due to said natural radioactivity of the mud layer and adding the detector counting rate due to gamma ray absorption in said mud layer, said casing and said cement layer.

References Cited in the file of this patent

Radioactivity Well Logs, Interpretation and Application, by V. J. Mercier, reprinted from "The Oil Weekly," October 14, 1946, and October 21, 1946, 11 pages.

"Lane-Wells Radioactivity Well Logging," Bulletin Ra–47–B, copyright 1948 by Lane-Wells Co., pp. 31–32.